US009456703B2

(12) United States Patent
O'Mahoney et al.

(10) Patent No.: US 9,456,703 B2
(45) Date of Patent: Oct. 4, 2016

(54) SYSTEM FOR DETERMINING OPTIMAL MATTRESS CHARACTERISTICS FOR INDIVIDUALS

(75) Inventors: Eoin O'Mahoney, Greystones (IE); Duncan Bain, Kings Langley (GB)

(73) Assignee: Kayfoam Woolfson, Dublin (IE)

( * ) Notice: Subject to any disclaimer, the term of this patent is extended or adjusted under 35 U.S.C. 154(b) by 264 days.

(21) Appl. No.: 14/361,822

(22) PCT Filed: Dec. 1, 2011

(86) PCT No.: PCT/EP2011/071569
§ 371 (c)(1),
(2), (4) Date: Sep. 18, 2014

(87) PCT Pub. No.: WO2013/079118
PCT Pub. Date: Jun. 6, 2013

(65) Prior Publication Data
US 2015/0029189 A1   Jan. 29, 2015

(51) Int. Cl.
*A47C 31/12*    (2006.01)
*G06T 17/00*    (2006.01)

(52) U.S. Cl.
CPC ............ *A47C 31/123* (2013.01); *G06T 17/00* (2013.01); *G06T 2207/10016* (2013.01); *G06T 2219/00* (2013.01)

(58) Field of Classification Search
None
See application file for complete search history.

(56) References Cited

U.S. PATENT DOCUMENTS

| 4,181,851 | A * | 1/1980 | Allen | G01S 3/7864 |
| | | | | 250/203.1 |
| 6,064,917 | A * | 5/2000 | Matson | G01N 21/4795 |
| | | | | 600/407 |
| 2008/0086258 | A1* | 4/2008 | Wall | G08G 1/081 |
| | | | | 701/117 |
| 2009/0062693 | A1* | 3/2009 | Woolfson | A61B 5/1077 |
| | | | | 600/587 |
| 2010/0026738 | A1* | 2/2010 | Saikawa | B41J 3/4075 |
| | | | | 347/1 |

(Continued)

FOREIGN PATENT DOCUMENTS

| DE | 202010006164 U1 | 1/2011 |
| WO | 0059346 A1 | 12/2000 |

(Continued)

OTHER PUBLICATIONS

MacCormick, Search Report for PCT/EP2011/071569, Aug. 1, 2012, 4 pages.

*Primary Examiner* — Said Broome
*Assistant Examiner* — Nurun N Flora
(74) *Attorney, Agent, or Firm* — LaBatt, LLC

(57) ABSTRACT

The present invention is related to a system for determining an optimal mattress type for an individual, the system comprising a body shape measurement assembly and an optimal mattress type determination means. The body shape measurement assembly comprising a plurality of reference measurement lines (110) and a camera (112) facing the plurality of reference measurement lines to measure the body shape of an individual in a receiving area in the system, by scanning a front image and side image of the individual, and analyzing the scanned images relative to the plurality of reference measurement lines so as to determine a front profile and a side profile of the individual. Thereafter, the profiles are used to construct a three dimensional model of the individual and in conjunction with the sleeping habits of the individual, the system categorizes the individual one of a predetermined set of different individual types and selects an optimal mattress type from a predetermined set of different mattress types based on the individual type.

20 Claims, 14 Drawing Sheets

(56) References Cited

U.S. PATENT DOCUMENTS

| | | | |
|---|---|---|---|
| 2011/0022965 A1* | 1/2011 | Lawrence | G06F 3/011 715/747 |
| 2011/0224510 A1* | 9/2011 | Oakhill | A61B 5/11 600/301 |
| 2011/0313745 A1* | 12/2011 | Mezghani | G01V 99/00 703/10 |
| 2011/0319499 A1* | 12/2011 | Semba | A61K 31/00 514/770 |

FOREIGN PATENT DOCUMENTS

| | | |
|---|---|---|
| WO | 2009108228 A1 | 3/2009 |
| WO | 2009102362 A1 | 8/2009 |

\* cited by examiner

SYSTEM FOR DETERMINING OPTIMAL MATTRESS CHARACTERISTICS FOR INDIVIDUALS

This invention relates to a system for determining optimal mattress characteristics for an individual.

It is important for an individual to use a mattress which has characteristics that are suited to that individual. In particular, a mattress is observed to comprise three salient characteristics, namely, support, conformity and viscosity. Support is essentially the firmness of the mattress itself which ranges from a soft support to a hard support; conformity is a measurement of the ability of the mattress to deform around a user's body without neighbouring parts of the mattress also deforming, and, viscosity is the ability of the mattress to receive a body prominence, such as a shoulder or a hip without too high a resistance.

The correct combination of these mattress characteristics can result in a mattress which is highly suited to a particular individual's body type, taking into account their sleeping habits.

Different body shapes having different weight distributions allied to the different sleeping habits of an individual all have a bearing on the optimal type of mattress which that individual should use.

By way of example, a curvy S-spine, which curves along the cervical curve, the thoracic curve and the lumbar curve, has a number of outwardly jutting prominences and will require a certain amount of yield in the mattress without allowing excessive bridging to occur. Excessive bridging occurs if the mattress has a low conformity and the prominences of the curvy S-spine dig into parts of the mattress at contact points causing neighbouring parts of the mattress between the contact points to also deform and prohibit those neighbouring parts of the mattress from supporting the body. Thus, an individual with a curvy S-spine is best suited to a mattress with, inter alia, high conformity if that individual's dominant sleeping position is on their back.

A heavy set individual should use a mattress with a lot of support thus preventing the individual from sinking into the mattress.

It is known to measure certain characteristics of an individual to ascertain which mattress type would best suit that individual. Examples of existing known mattress recommendation technologies and systems are provided hereinafter.

In U.S. Pat. No. 6,585,328 (L&P PROPERTY MANAGEMENT CO.) a pressure point mapping system is used to determine which parts of the individual's body apply most pressure when the individual is lying on a mattress. Based on the pressure map, a particular type of mattress is recommended to the individual. There are a number of problems with this known pressure mapping technique.

Firstly, it is necessary to calibrate the pressure pads on each occasion before use which is both time-consuming and can be burdensome as the calibration is difficult to carry out. Secondly, the wear and tear on pressure pads has been found to be quite high, leading to high operation costs as the pressure pads must be repaired and/or replaced on a regular basis.

Furthermore, in order for the pressure mapping system to work effectively, the individual must lie down on the pressure pads as if they were lying on a mattress to sleep. It has been found that many individuals feel uncomfortable lying prone on a mattress in a public area such as a shop and it is preferable if the measurements to determine an optimal mattress type for the individual are carried out without necessitating the individual to lie down in a prone position.

Moreover, the pressure mapping system of U.S. Pat. No. 6,585,328 will produce different results for the same individual when measured using different mattresses beneath the individual. The pressure mapping system is dependant on two variables, namely, the individual's body type and the mattress type which is used during the measurement, and, consequently pressure mapping systems can only be accurately said to define the interaction between an individual and a specific mattress type. The individual may have to use the pressure mapping system on a large number of different mattress types before a satisfactory result, indicating an appropriate mattress for that individual, is obtained.

PCT Patent Publication Number WO01/37692 (T. M. SRL) discloses a dais atop which an individual is placed and rotated in front of a camera against a backlit screen. The camera takes ninety-two silhouettes of the individual to build up a model of the individual. In this manner, the individual does not need to lie down prone in a public area.

However, the equipment required to carry out the measurement as disclosed in PCT Patent Publication Number WO01/37692 is a very expensive. A large amount of processing is required in order to convert the ninety-two silhouettes into a model. It has also been found that the amount of time required to take ninety-two silhouette images of the individual is relatively long and this is uncomfortable for the individual as they must remain quite static on the dais as it is being slowly rotated to allow the camera to take all of the silhouette images.

Furthermore, the backlit screen necessitates that the ambient light levels are quite low so that an accurate silhouette of the individual can be captured on each occasion in order to construct an accurate and detailed model of the individual.

Various other systems are also known which typically measure the pressure exerted by an individual when lying on a mattress. As discussed above, these pressure mapping systems have a number of significant drawbacks.

It is a goal of the present invention to provide a system and apparatus that overcomes at least one of the above mentioned problems.

SUMMARY OF THE INVENTION

The present invention is directed to a mattress recommendation system. In particular the present invention is related to a system for determining an optimal mattress type for an individual, the system comprising a body shape measurement assembly and an optimal mattress type determination means; the body shape measurement assembly comprising a plurality of reference measurement lines which are arranged in parallel and are spaced apart from one another, and, a camera facing the plurality of reference measurement lines which is distanced from the reference measurement lines so as to form a receiving area for the individual; the body shape measurement assembly measuring the body shape of the individual in the receiving area by scanning a front image and side image of the individual, analysing the scanned images relative to the plurality of reference measurement lines so as to determine a front profile and a side profile of the individual, which profiles are subsequently used to construct a three dimensional model of the individual; the optimal mattress type determination means comprising an input device, a processor and an output screen; the input device receiving information on the sleeping habits of the individual; the processor analysing the information on the sleeping habits of the individual in conjunction with the three dimensional model of the individual so as to categorise the individual as one of a predetermined set of different individual types; the processor selecting an optimal mattress type from a predetermined set of different mattress types based on the individual type; and, the output screen displaying the selected optimal mattress type for the individual.

The advantage of providing a system of this type is that a relatively simple setup using a plurality of reference measurement lines can be used and a coarse but sufficient model of an individual may be established to allow the selection of an optimal mattress characteristic(s) for that individual. It has been thought heretofore that a more detailed model would lead to a better mattress recommendation as the model would be more accurate and hence the analysis of the model would lead to a more optimal mattress recommendation. However, it has been found that a range of approximately thirty different mattress types may be sufficiently addressed by a coarse model of the individual when taken in conjunction with information on the sleeping habits of the individual. The relatively coarse measurement allows for a simplified algorithm to be used. The sleeping habits of the individual may include: preferred sleeping position (e.g. side, front, back), number of hours spent in bed, size and type of bed (e.g. single, double, king, queen) and the like.

Moreover, the entire process is very fast in comparison to taking a large number of silhouette images. As only front and side images need to be taken, the process typically last less than ten seconds for the individual and does not feel overly intrusive.

In a further embodiment, the body shape measurement assembly comprises an image processor to analyse the front image and side image by scanning along each of the plurality of reference measurement lines in the front image and side image respectively to determine a profile start point and a profile end point on each of the plurality of reference measurement lines where said profile start points and profile end points on each reference measurement line are defined by the start and end of the profile of the individual blocking a portion of that reference measurement line from the view of the camera.

The advantage of this type of analysis is that a rather simple, hexahedron based model may be established which can be subsequently used to extrapolate a number of anthropometric details such as height, body mass, mass distribution, and spinal curvature, for the individual.

In a further embodiment, the image processor scans from left to right along each of the plurality of reference measurement lines to determine a profile start point and the image processor scans from right to left along each of the plurality of reference measurement lines to determine a profile end point.

The advantage of scanning the reference measurement lines in this manner is that a more accurate profile start points and profile end points are determined. False start points due to light reflecting off lightly coloured clothing is avoided and a more accurate profile model can be obtained.

In a further embodiment, the optimal mattress type determination means compares the three dimensional model against an anatomy model to determine if the three dimensional model meets predetermined anatomical criteria.

The advantage of checking the three dimensional model against an anatomy model is that the size of different body parts in the model may be compared against each other to determine if the model is approximately in proportion. For example, if the individual is wearing a long coat, the model would indicate that the individual has an excessively long torso which would not fit with the predetermined anatomical criteria that form part of the anatomy model and consequently the system could correctly determine that the torso of the individual is not as long as the three dimensional model would suggest.

In a further embodiment, the image processor performs a Fourier Transform on the front image and side image to reduce ambient light in the front image and side image respectively. In a further embodiment, the image processor applies a homogeneity algorithm to the front image and side image to reduce light noise in the front image and side image respectively.

The advantage of applying these image processing techniques is that the quality of the image can be improved so as to obtain a more accurate three dimensional model.

In a further embodiment, the profile is defined by the portions of the reference measurement line that are the largest portions of the reference measurement line blocked from the view of the camera.

In a further embodiment, the plurality of reference measurement lines are constructed from electroluminescent wires.

In a further embodiment, the plurality of reference measurement lines are infrared wires. In yet a further embodiment, the reference measurement lines are luminescent reference measurement lines of a predetermined wavelength and the camera is particularly suited to capturing light of that predetermined wavelength.

In a further embodiment, the system further comprises a communications port to transmit results regarding the selected optimal mattress type directly to manufacturer for further processing.

In a further embodiment, only a portion of the individual's body is measured.

In a further embodiment, the portion of the individual's body which is measured is the upper portion; and, the height of the individual is determined by finding the height of the highest broken reference measurement line; locating a shoulder height reference line which is found by determining the highest profile start point and profile end point which are at least 250 mm apart; counting the number of broken reference measurement lines above this shoulder height reference line; and, adding 100 mm to the height of the highest broken reference measurement line if only one broken reference measurement line is above the shoulder height reference to give the approximate height of the individual, or, adding 25 mm to the height of the highest broken reference measurement line if two broken reference measurement lines are above the shoulder height reference line, to give the approximate height of the individual.

In a further embodiment, the body shape measurement assembly determines body mass, mass distribution and spinal curvature for at least a portion of the individual's body.

In a further embodiment, the three dimensional model of the individual is comprised of hexahedrons. In a further embodiment, the body mass of the individual is calculated by determining the aggregate volume of the hexahedrons in the three dimensional model and multiplying the aggregate volume by a predetermined weight coefficient.

In a further embodiment, the mass distribution of the individual is calculated by determining a cross-sectional area of a hip-height hexahedron which partially forms the three dimensional model and is located at approximately 50% of the height of the model, and, determining a cross-sectional area of a waist-height hexahedron which partially forms the three dimensional model and is located at approximately 65% of the height of the model; and, dividing the cross-sectional area of the hip-height hexahedron by the cross-sectional area of the waist-height hexahedron to determine the mass distribution of the individual.

In a further embodiment, the spinal curvature of the individual is calculated by locating the positions of the neck and sacrum on the individual which are found as a percentage of the individual's height; and the standard deviation, of the profile end points approximately located at the individual's neck and sacrum positions, from a reference point, is calculated to give the spinal curvature of the individual.

In a further embodiment, the body mass, mass distribution and spinal curvature of the individual are calculated are determined to fall into one of three preset ranges respectively.

This is advantageous as only a small number of different combinations of individual body types can be determined. This small number of different individual body types can increase or decrease when taking into account further information regarding the individual's sleeping habits. Thusly, an individual type of the individual is determined based on the individual body type and sleeping habits. As the individual's body type is based on preset ranges, the different combinations are kept to a minimum to only allow a small number of different individual types to be determined. This is clearly of great benefit from a manufacturing point of view, whereby only a small number of different mattress types need to be offered to cater for the small number of different individual types. Previously, bespoke mattress recommendation systems offered a large range of different mattress types which was extremely troublesome and expensive from a manufacturing standpoint.

In a further embodiment, the combination of the preset ranges for the individual's body mass, mass distribution and spinal curvature is used to categorise the individual into one of the predetermined set of different individual types.

In a further embodiment, at least two sets of a plurality of reference measurement lines are provided substantially orthogonally to one another, and, at least two cameras are provided with the two cameras facing the two sets of the plurality of reference measurement lines respectively.

This is advantageous as both the front profile image and the side profile image may be taken contemporaneously within the booth.

DETAILED DESCRIPTION OF EMBODIMENTS

The invention will be more clearly understood from the following description of some embodiments thereof, given by way of example only with reference to the accompanying drawings, in which.

Figure 1:
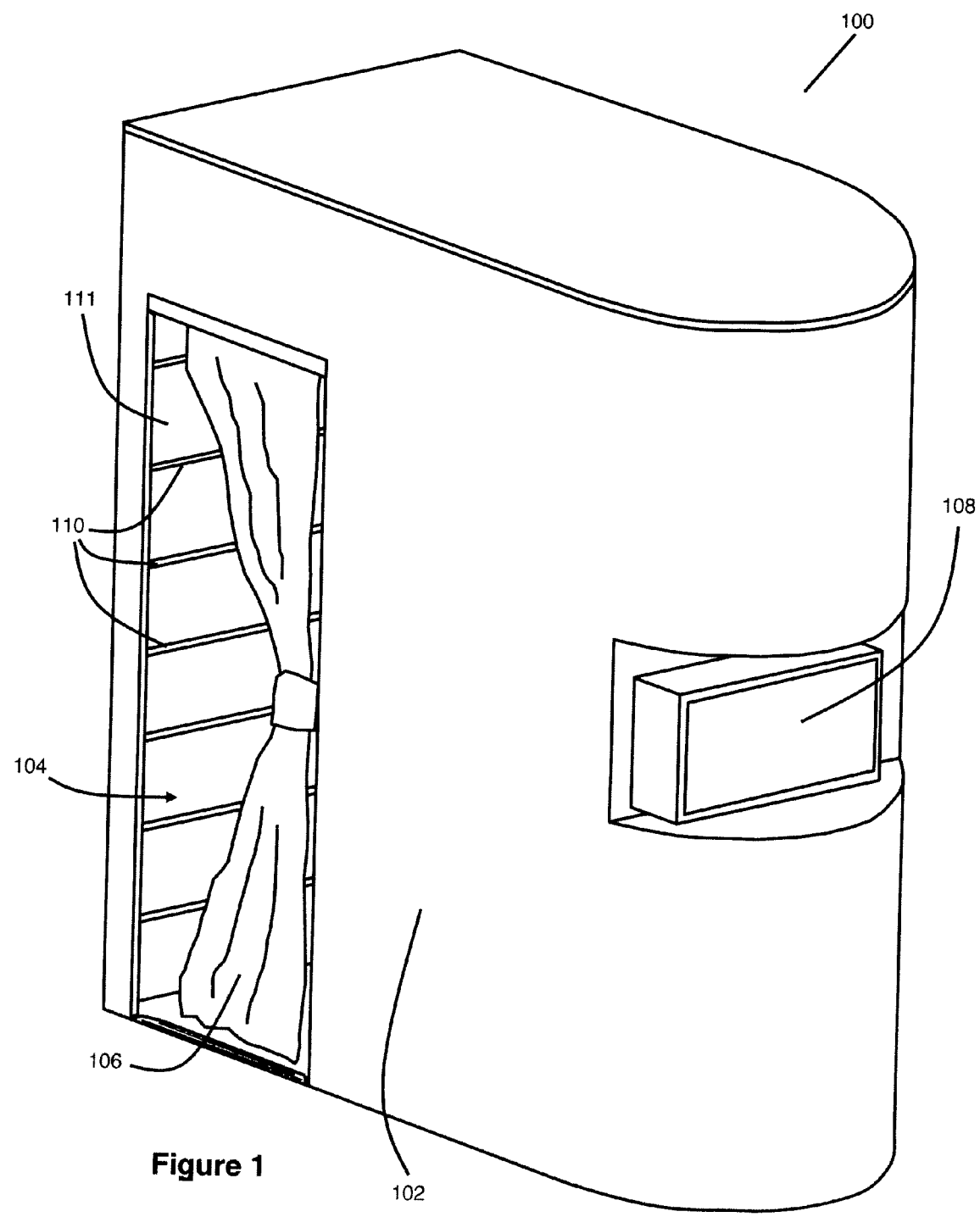
FIG. 1 is a perspective view of a booth housing a mattress recommendation system in accordance with the present invention.
Figure 2:
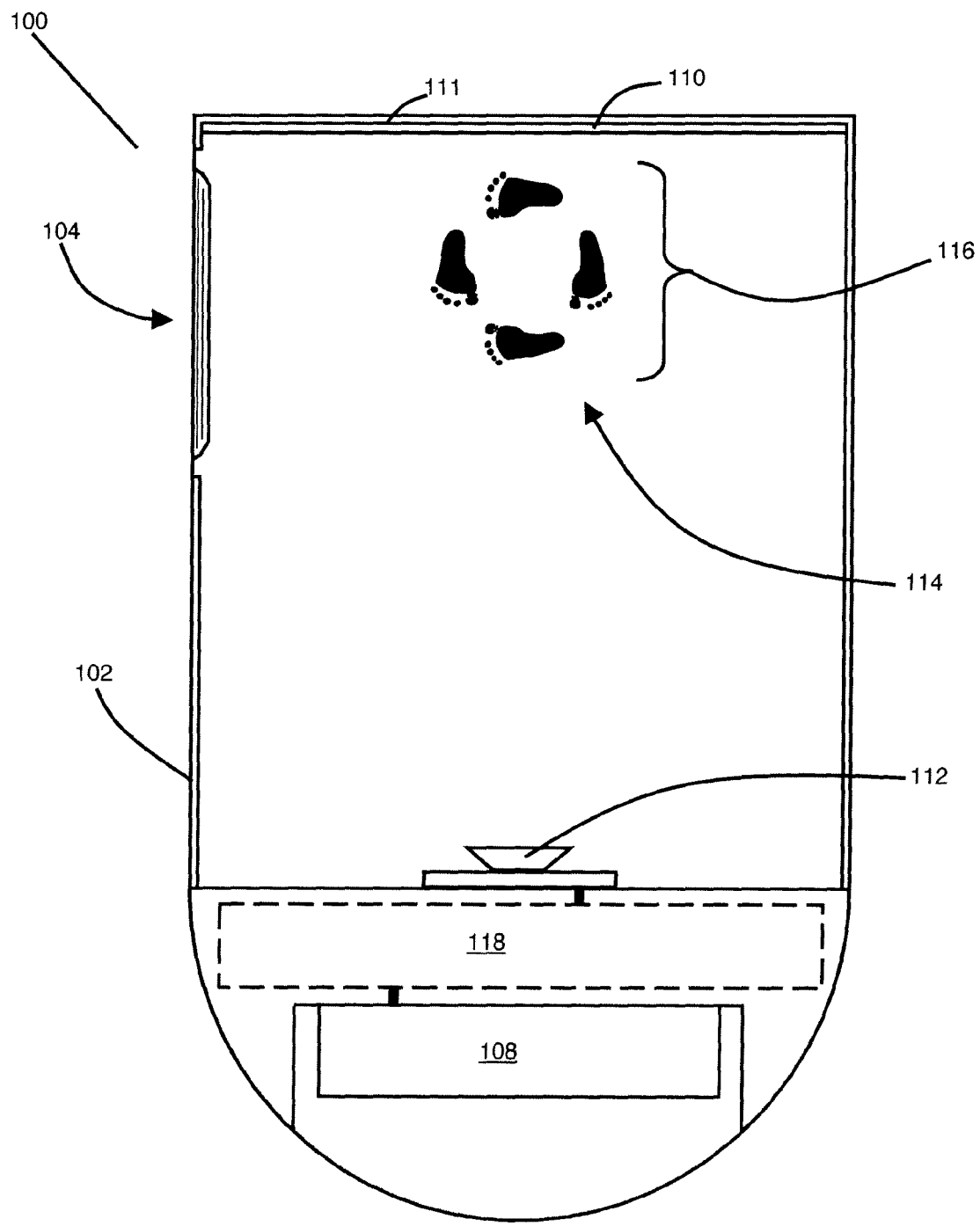
FIG. 2 is a top plan view of the booth of FIG. 1.

Referring to FIGS. 1 and 2 together, there is provided a mattress recommendation system indicated generally by reference numeral 100. The mattress recommendation system 100 is housed in a booth 102.

The booth 102 comprises an entrance way 104 which may be covered using a curtain 106 to provide a darkened space within the booth 102. A touchscreen 108 is mounted on an exterior wall of the booth 102.

A plurality of reference measurement lines 110 are provided on a rear inner wall 111 of the booth 102. The plurality of reference measurement lines 110 are mounted on the rear inner wall 111 in a substantially horizontal, parallel and spaced apart manner. The plurality of reference measurement lines 110 are light emitting lines or highly reflective lines to ensure that the exact position of the lines can be clearly and unambiguously detected by a camera 112, located within the booth 102.

The camera 112 faces the plurality of reference measurement lines 110 and is distanced from the plurality of reference measurement lines 110 to form a receiving area for an individual, the receiving area indicated generally by reference numeral 114 within the booth 102.

The plurality of reference measurement lines 110 and the camera 112 together form a body shape measurement assembly. An individual (not shown) is placed in the receiving area 114 inside the booth 102 and a three dimensional model of the individual is established by the mattress recommendation system 100 so as to assist with selecting the most optimal mattress characteristics for that particular individual.

The reference measurement lines 110 may be advantageously electroluminescent wires which are illuminated to allow the camera 112 to clearly and accurately capture the exact positions of the plurality of reference measurement lines 110. The camera 112 may periodically calibrate itself by taking images of the plurality of reference measurement lines 110 whilst there are no individuals in the booth 102. In this manner, the mattress recommendation system 100 can ensure that the three dimensional model of the individual is as accurate as possible.

Feet placement markings 116 are provided on the floor in the receiving area 114. The feet placement markings 116 direct an individual standing in the booth 102 to face towards the camera 112 for a front profile image of the individual to be taken by the camera 112 and also to face towards the entrance way 104 for a side profile image of the individual to be taken by the camera 112. Obviously, the left-side profile of the individual or the right-side profile of the individual will equally well suffice for the purposes of the side profile image of the individual.

The front profile image and the side profile image are amalgamated together to form the three-dimensional model of the individual as described further hereinbelow.

The touchscreen 108 may be operated by the individual, or, by an operator, such as a shop assistant, who may guide the individual through the process. The touchscreen 108 is used to direct the individual through the process of establishing the three dimensional model of that individual. Furthermore, the touchscreen 108 can be used to receive information regarding the individual, including the individual's name, address, age and sleeping habits. For example, it is advantageous to know whether the individual prefers to predominantly sleep on their side, their back or on their front. Furthermore, it is advantageous to know whether the individual sleeps in a double bed with another person or in a single bed on their own. Such queries may be put to the individual through the touchscreen 108, and the touchscreen 108 also acts as an input device to receive response forming the above-mentioned information about the individual.

The touchscreen 108 is connected to a processor 118 which are used together to form an optimal mattress type determination means.

It will be appreciated that the booth 102 may comprise a further screen inside the booth 102 which can be used to direct the individual into the correct standing positions within the booth 102.

Figure 3:
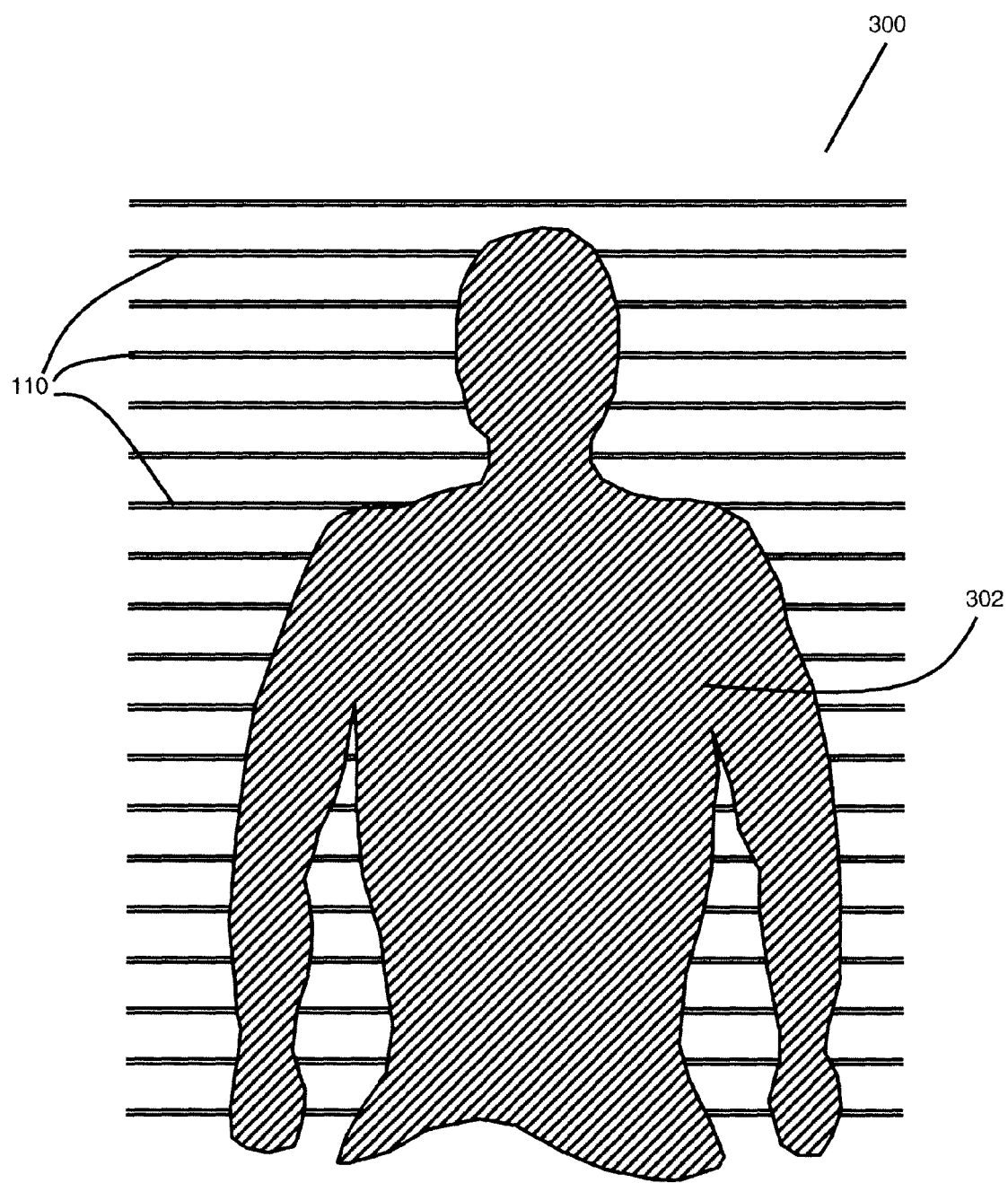
FIG. 3 is an image of an individual's front profile to the fore of a plurality of reference measurement lines in accordance with the present invention.
Figure 4:
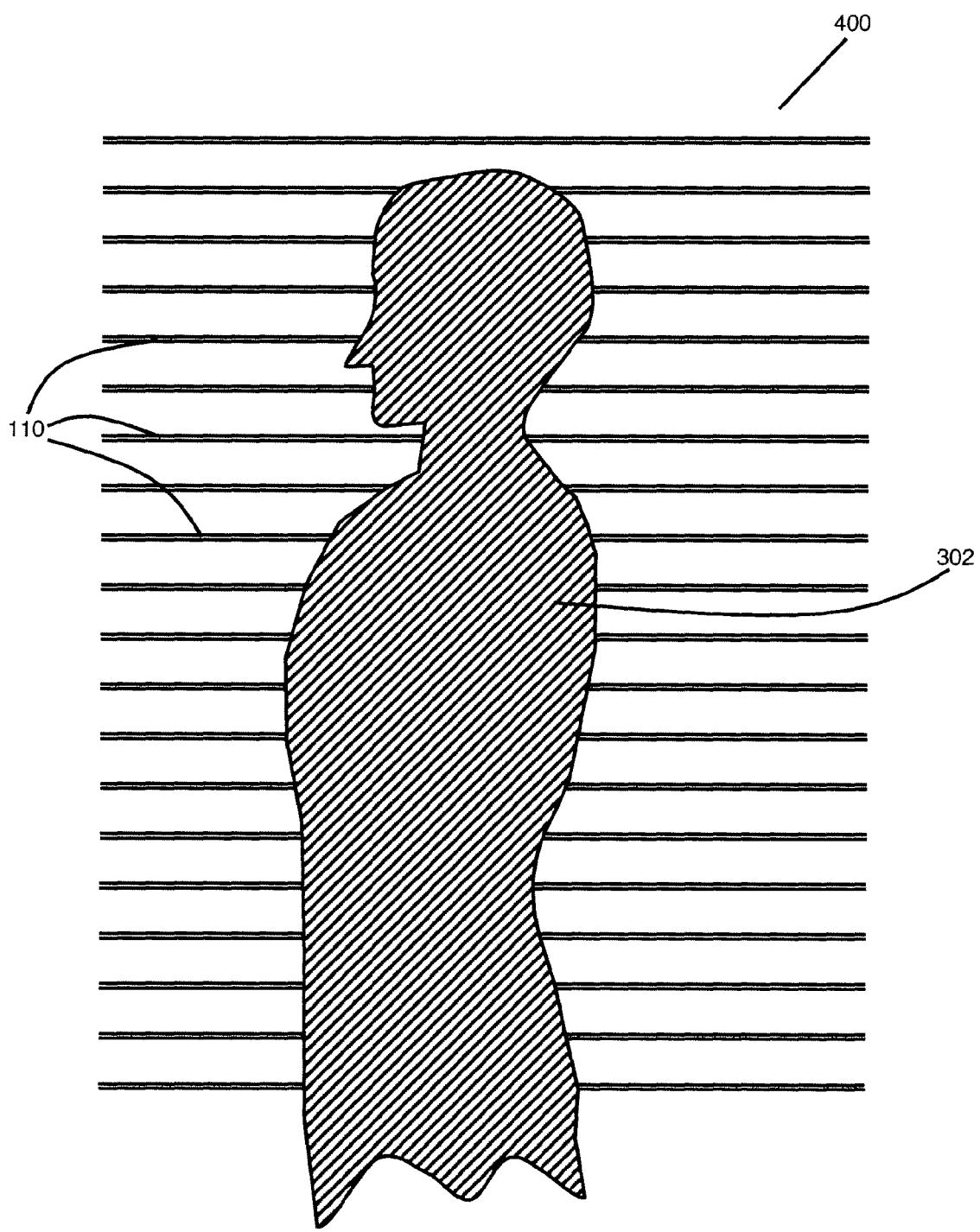
FIG. 4 is an image of the individual's side profile against the plurality of reference measurement lines of FIG. 3.

Referring to FIG. 3, the camera takes a front profile image indicated generally by reference numeral 300, of an individual 302 who is standing to the fore of the plurality of reference measurement lines 110. With reference to FIG. 4, the camera also takes a side profile image indicated generally by reference numeral 400, of the individual 302 who is again standing to the fore of the plurality of reference measurement lines 110.

The front profile image 300 and the side profile image 400 are analysed and amalgamated to form the three dimensional model of the individual 302 as is described hereinunder.

Referring to FIGS. 5 to 13 inclusive, the formation of the three dimensional model is described hereinbelow.

Figure 5:
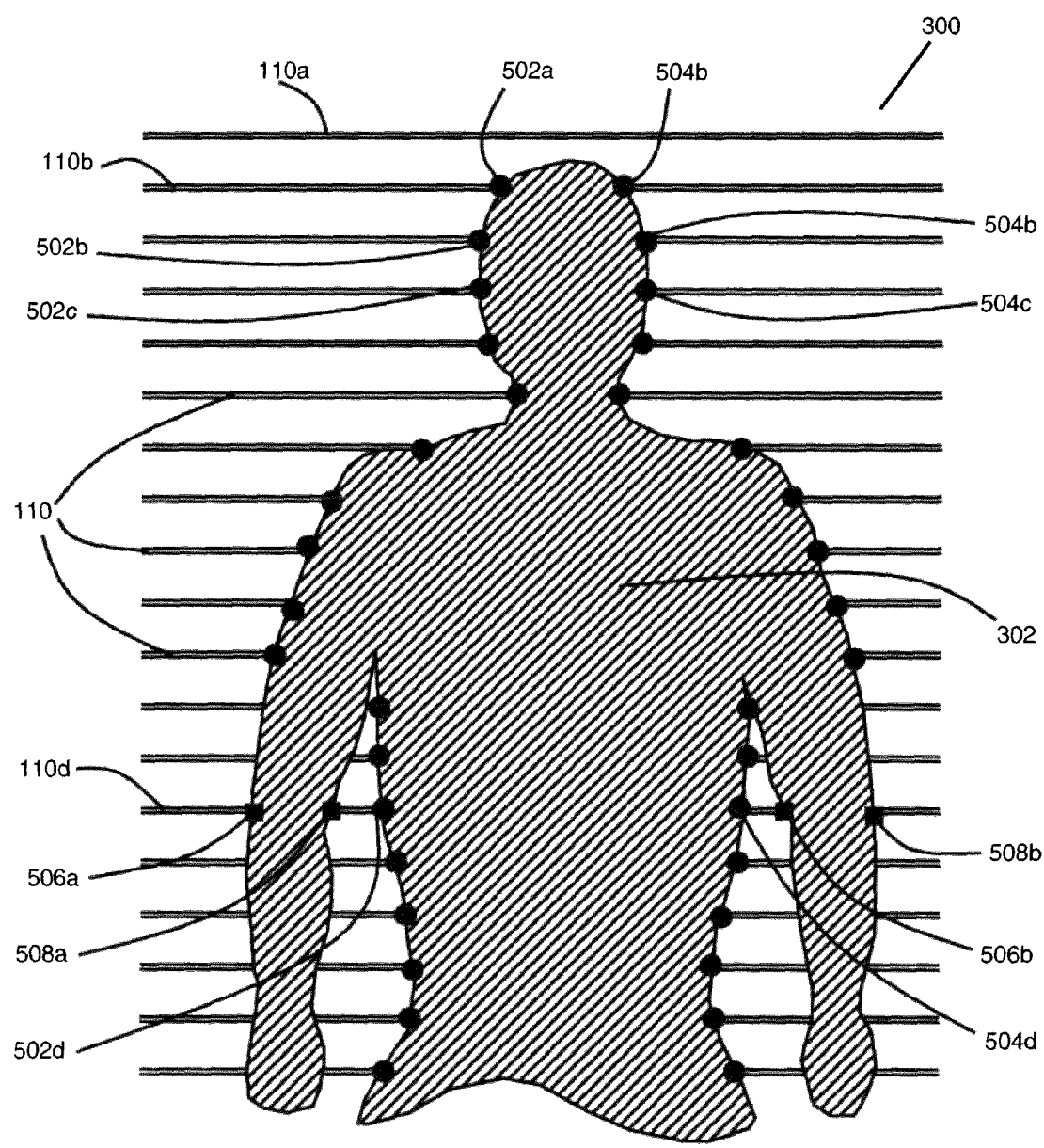
FIG. 5 is the front profile image of FIG. 3 showing the individual's front profile along with start profile points and end profile points on some of the plurality of reference measurement lines.

Referring to FIG. 5, the front profile image 300 is scanned and analysed by the processor. The front profile image 300 is scanned and analysed by locating a substantially leftmost point on an uppermost reference measurement line 110*a*. The processor scans across the reference measurement line 110*a* from left to right to determine if there is a break in the reference measurement line 110*a*. As this reference measurement line 110*a* in FIG. 5 is unbroken by the profile of the individual 302, the processor moves on to the reference measurement line which is below the most recently scanned reference measurement line. In this case, the reference measurement line which is below the most recently scanned reference measurement line is the second highest reference measurement line 110*b*, immediately beneath the uppermost reference measurement line 110*a*, and this reference measurement line 110*b* is scanned.

Beginning at a substantially leftmost part of the second-highest reference measurement line 110*b*, the processor scans across the reference measurement line 110*b* until the transition from the brightness of the light emitting, electroluminescent wire reference measurement line 110*b* to the darkness of the profile of the individual 302 is detected. The transition from a bright reference measurement line 110*b* to a dark portion in the profile of the individual 302 determines a profile start point 502*a* on the second-highest reference measurement line 110*b*.

The processor continues to scan across in a substantially horizontal manner to determine the transition from the darkness of the profile of the individual 302 to the brightness of the light emitting electroluminescent wire reference measurement line 110*b*. This dark to bright transition represents a profile end point 504*a* on the second highest reference measurement line 110*b*.

In a systematic manner, the processor works its way across each reference measurement line 110 from left to right in descending succession to determine the profile start points 502*c*, 502*d* and the profile end points 504*c*, 504*d* on each of the broken reference measurement lines 110.

Figure 7:
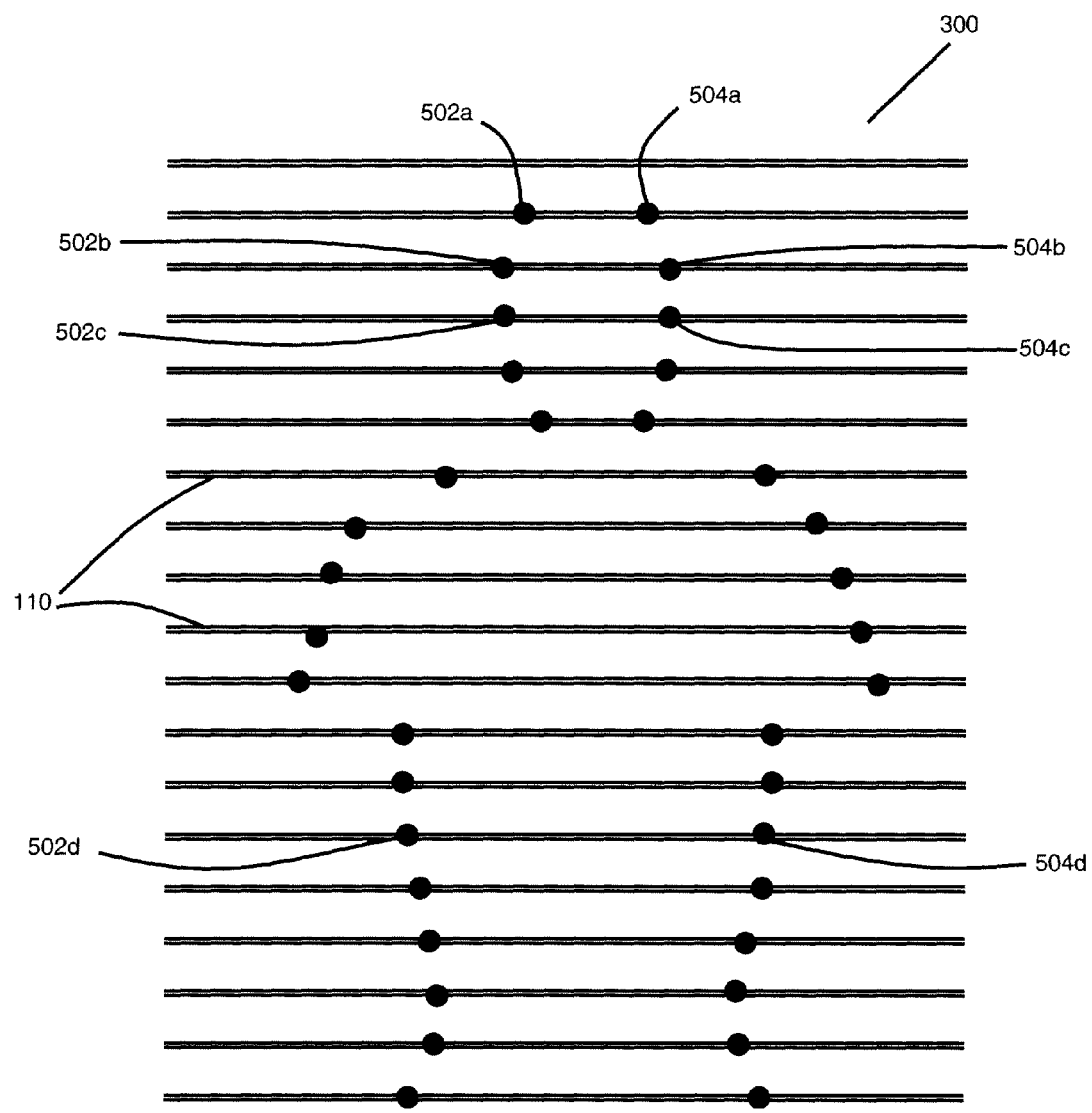
FIG. 7 is the front profile image of FIG. 5 showing the start profile points and the end profile points on some of the plurality of reference measurement lines.

In such a fashion, the start profile points 502 and end profile points 504 of the front profile of the individual can be determined as is shown in FIG. 7.

Referring briefly to FIG. 5, the arms of the individual may cause additional false start points 506*a*, 506*b* and false end points 508*a*, 508*b* to be detected. In this case, the processor will select the profile start point 502*d* and profile end point 504*d* which define a profile portion having the largest distance therebetween in the sense that it represents the largest break along the reference measurement line 110*c*, as being the true start point 502*d* and true end point 504*d* of the profile of the individual 302.

In a further embodiment, it is envisaged that the individual could be directed to place their hands and arms across their chest thus avoiding any false start points and false end points being detected, and therefore allowing a simpler a detection algorithm to be used.

In a further embodiment, the processor would scan from left to right from a substantially leftmost point on each reference measurement line 110 towards a substantially mid-point on the reference measurement line 110 for the profile start point 502, and, would scan from right to left from a substantially rightmost point on each reference measurement line 110 towards the substantially mid-point on the reference measurement line 110 for the profile end point 504. This method reduces the number of false profile start points and false profile end points due to light clothing which reflects the light and can cause early detection of a transition.

Figure 6:
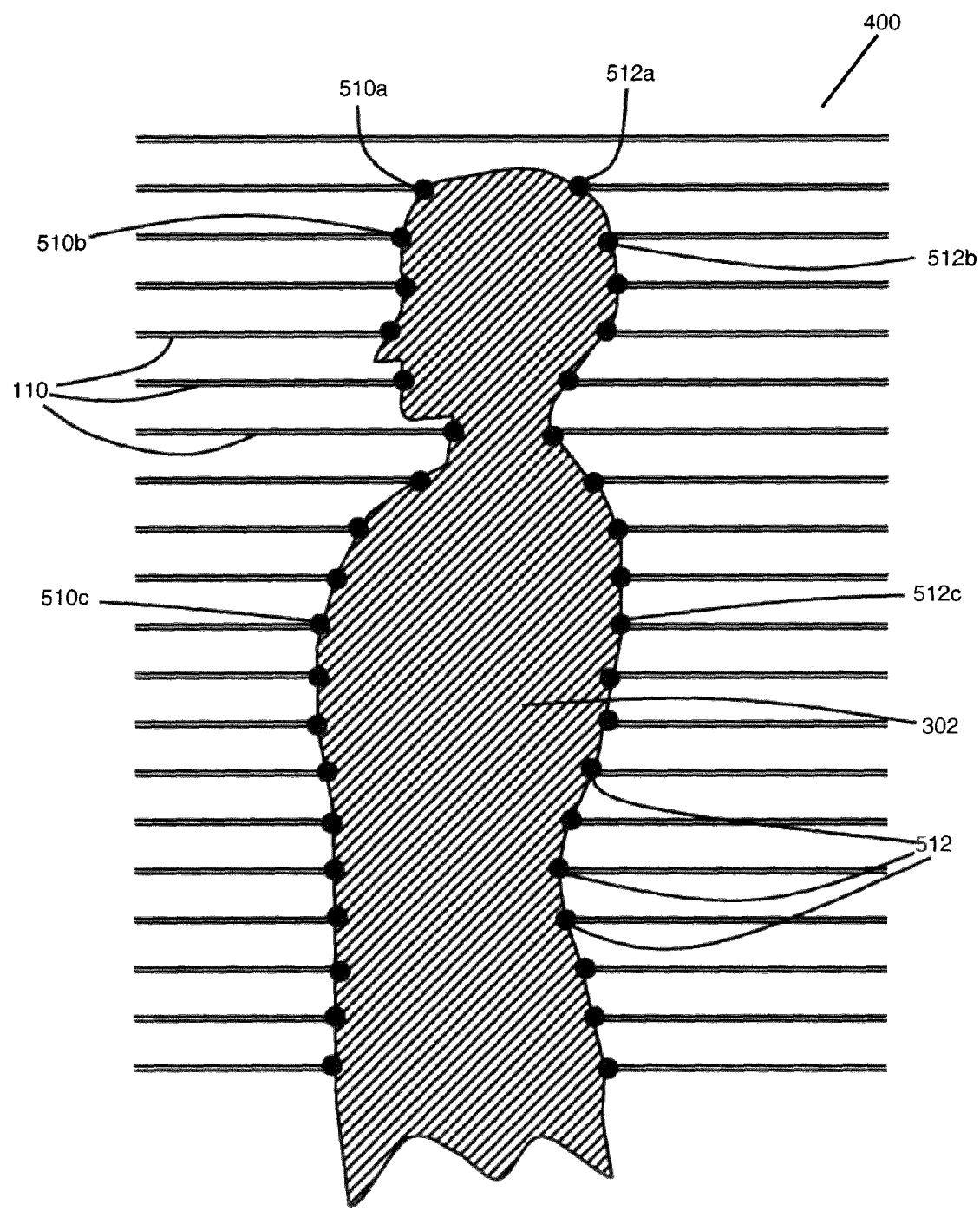
FIG. 6 is the side profile image of FIG. 4 showing the individual's side profile along with start profile points and end profile points on some of the plurality of reference measurement lines.

Referring to FIG. 6, analogously, the profile start points 510*a*, 510*b*, 510*c* and the profile end points 512*a*, 512*b*, 512*c* are determined for the side profile image 400 of the individual 302.

Figure 8:
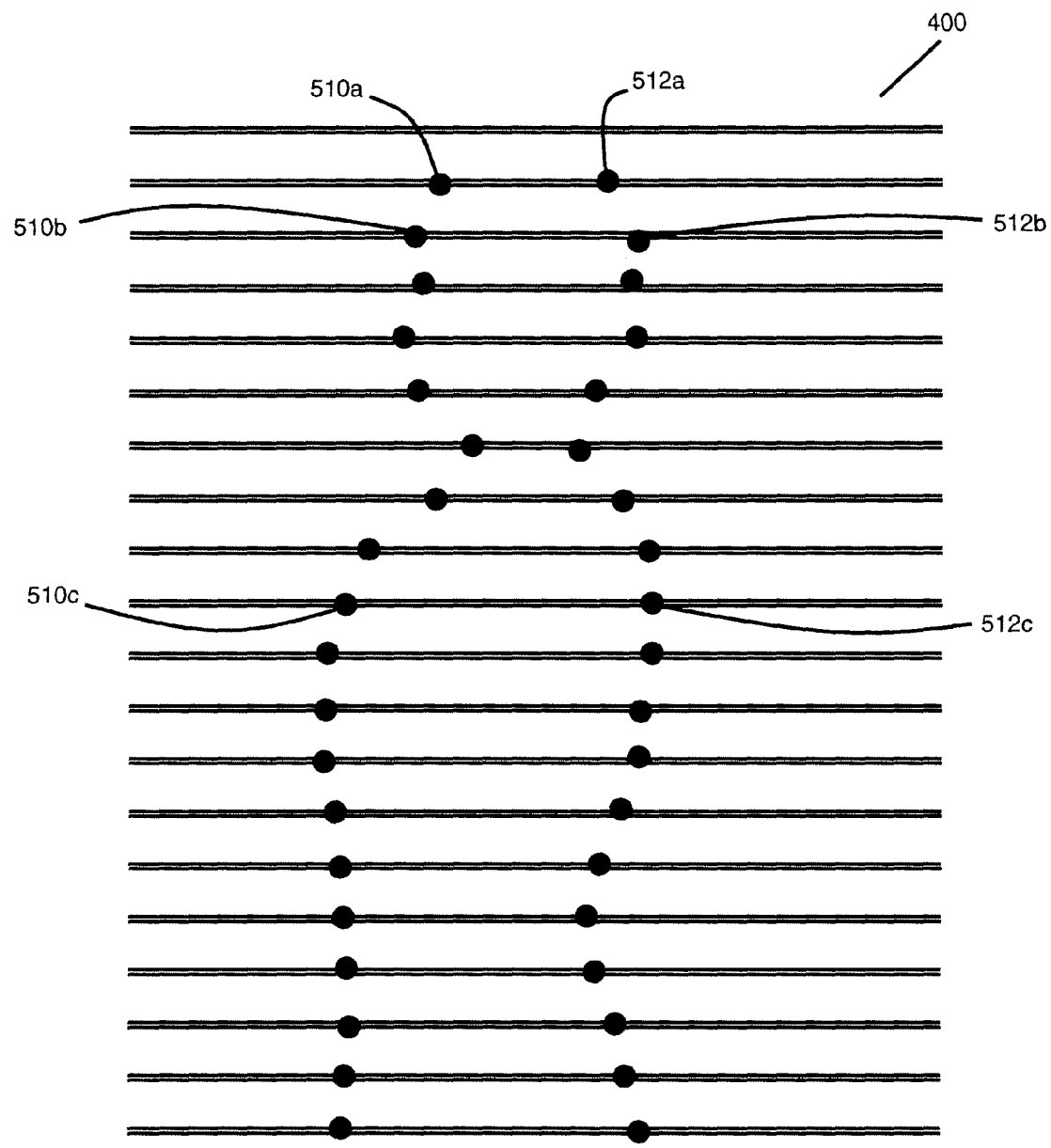
FIG. 8 is a the side profile image of FIG. 6 showing the start profile points and the end profile points on some of the plurality of reference measurement lines.

Referring to FIGS. 7 and 8, the front profile image 300 and the side profile image 400 are shown respectively. The images are processed to only show the profile start points 502*a*, 502*b*, 502*c*, 502*d* and the profile end points 504*a*, 504*b*, 504*c*, 504*d* on the front profile image 300, and, the profile start points 510*a*, 510*b*, 510*c* and the profile end points 512*a*, 512*b*, 512*c* on the side profile image 400.

Figure 9:
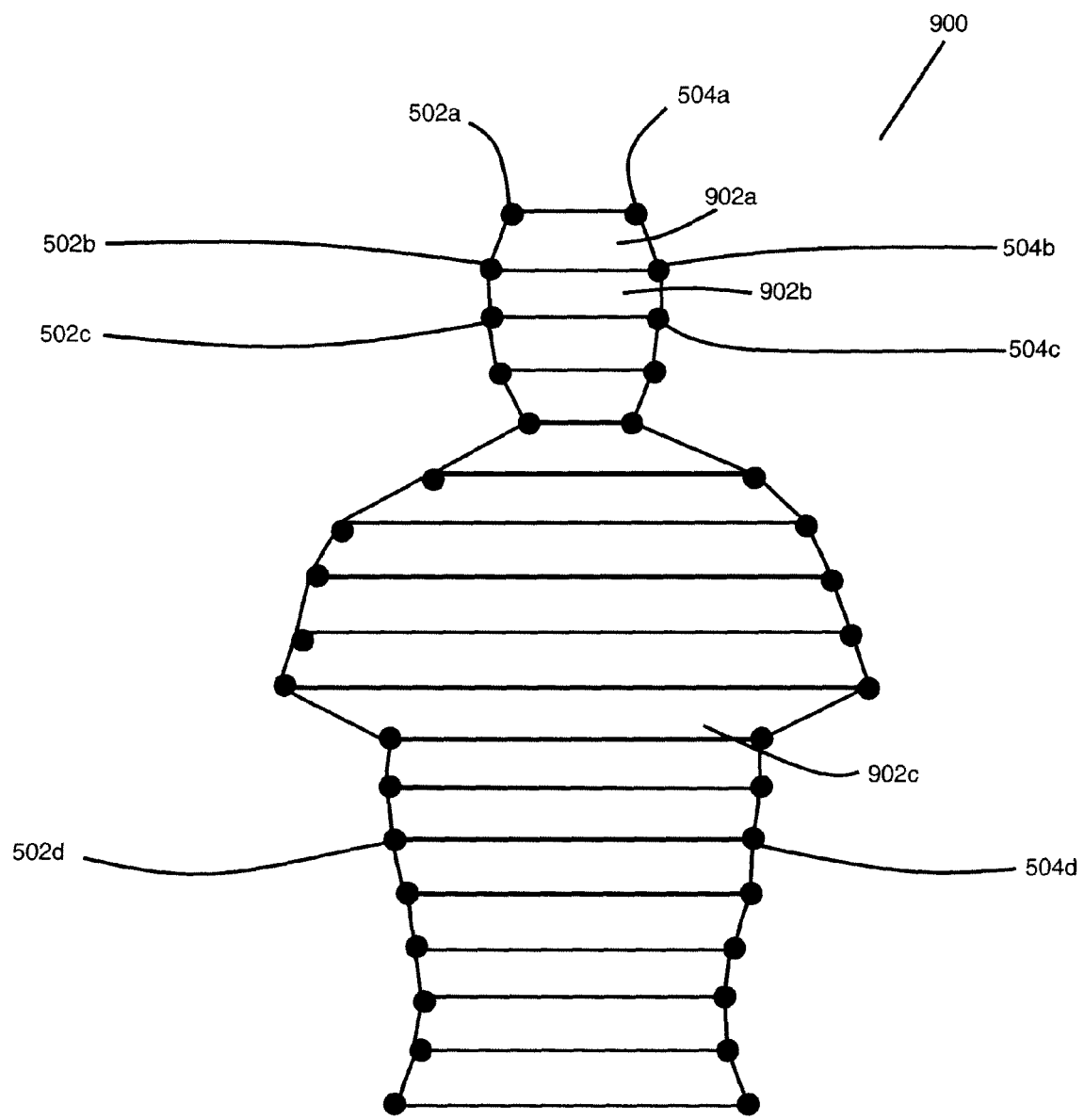
FIG. 9 is the front profile image of FIG. 7 showing the start profile points and the end profile points connected to form a plurality of front profile trapezoids.
Figure 11:
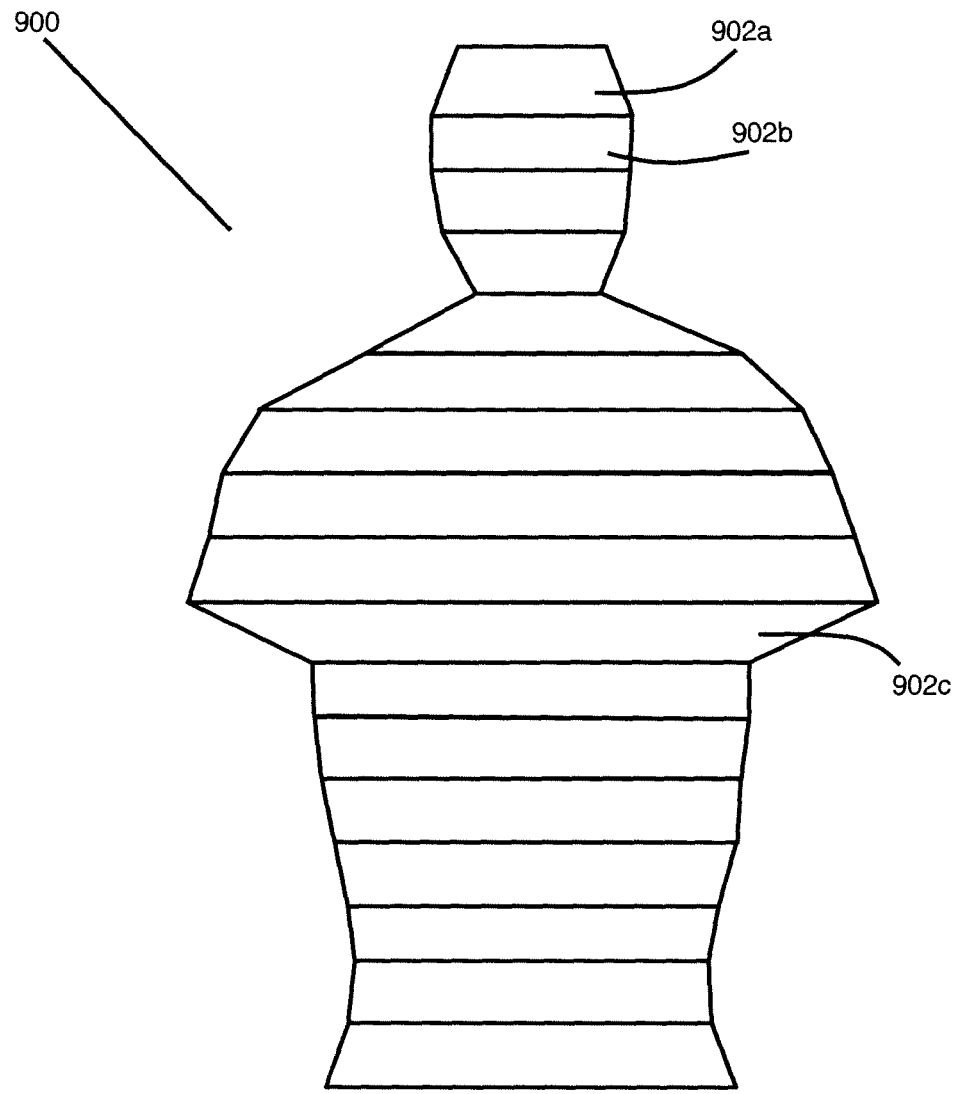
FIG. 11 is the front profile image of FIG. 9 showing the plurality of front profile trapezoids.

With reference to FIGS. 9 and 11, a two dimensional front profile image indicated generally by reference numeral 900 is shown. The two dimensional front profile image 900 comprises a plurality of front profile trapezoids 902*a*, 902*b*, 902*c*. The plurality of front profile trapezoids 902*a*, 902*b*, 902*c* are defined by the profile start points 502 and profile end points 504 of the front profile image. For example, the uppermost front profile trapezoid 902*a* is defined by profile start points 502*a*, 502*b* and profile end points 504*a*, 504*b*.

Figure 10:
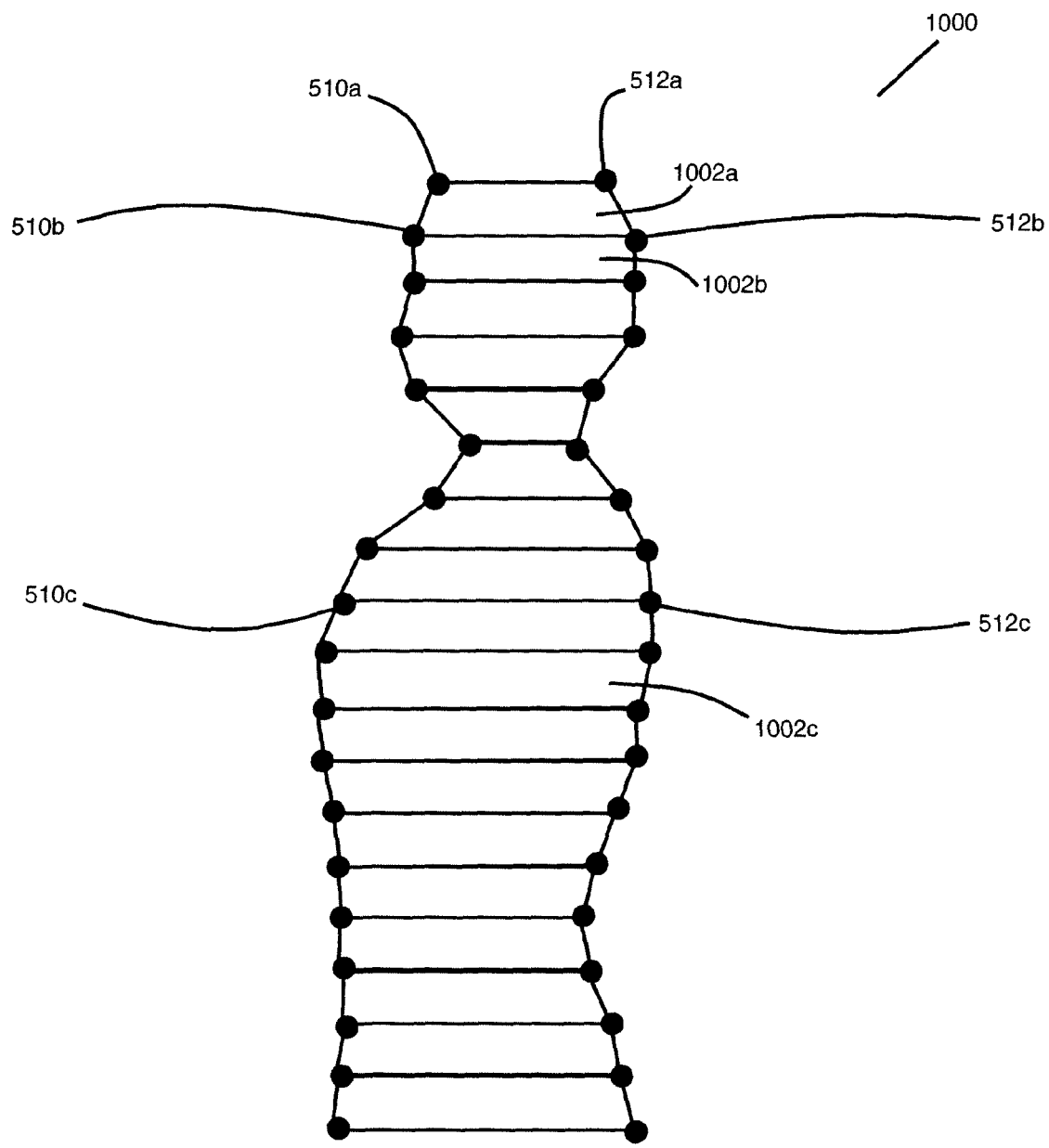
FIG. 10 is the side profile image of FIG. 8 showing the start profile points and the end profile points connected to form a plurality of side profile trapezoids.
Figure 12:
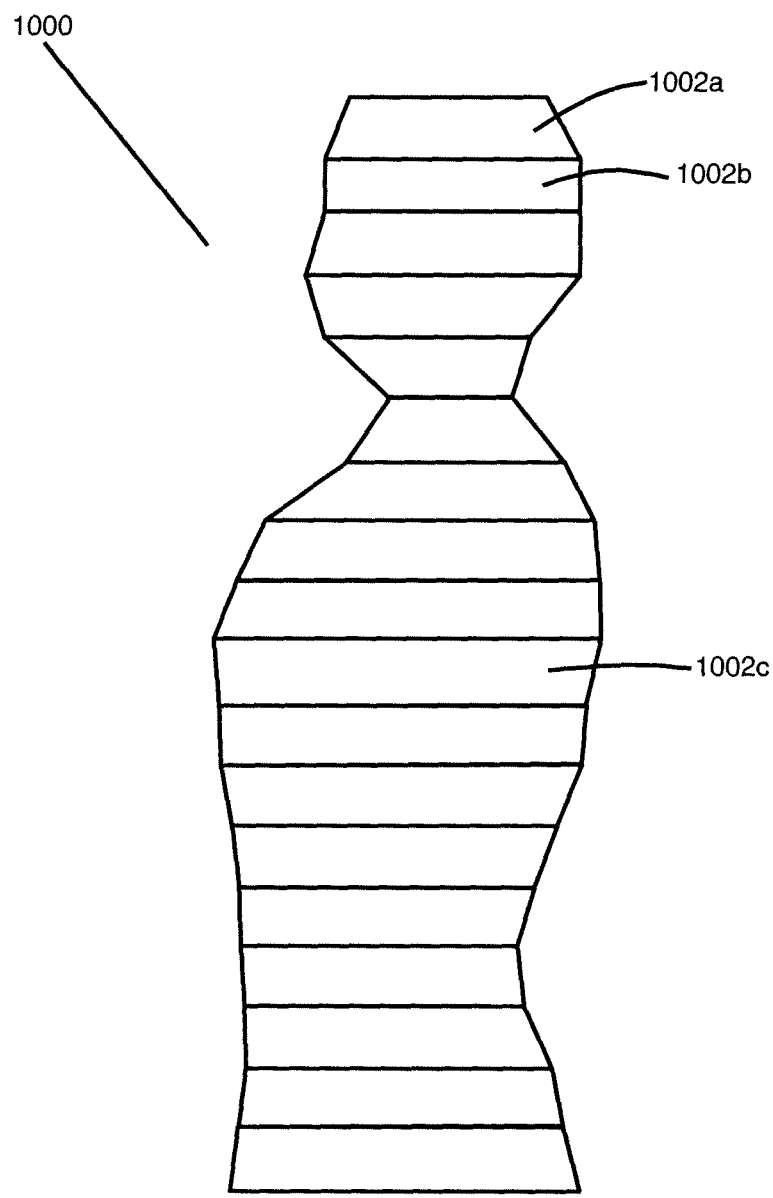
FIG. 12 is the side profile image of FIG. 10 showing the plurality of side profile trapezoids.

Similarly to the above and referring in particular to FIGS. 10 and 12, a two dimensional side profile image indicated generally by reference numeral 1000 is shown. The two dimensional side profile image 1000 comprises a plurality of side profile trapezoids 1002a, 1002b, 1002c. The plurality of side profile trapezoids 1002a, 1002b, 1002c are defined by the profile start points 510 and profile end points 512 of the side profile image. For example, the uppermost side profile trapezoid 1002a is defined by profile start points 510a, 510b and profile end points 512a, 512b.

Figure 13:
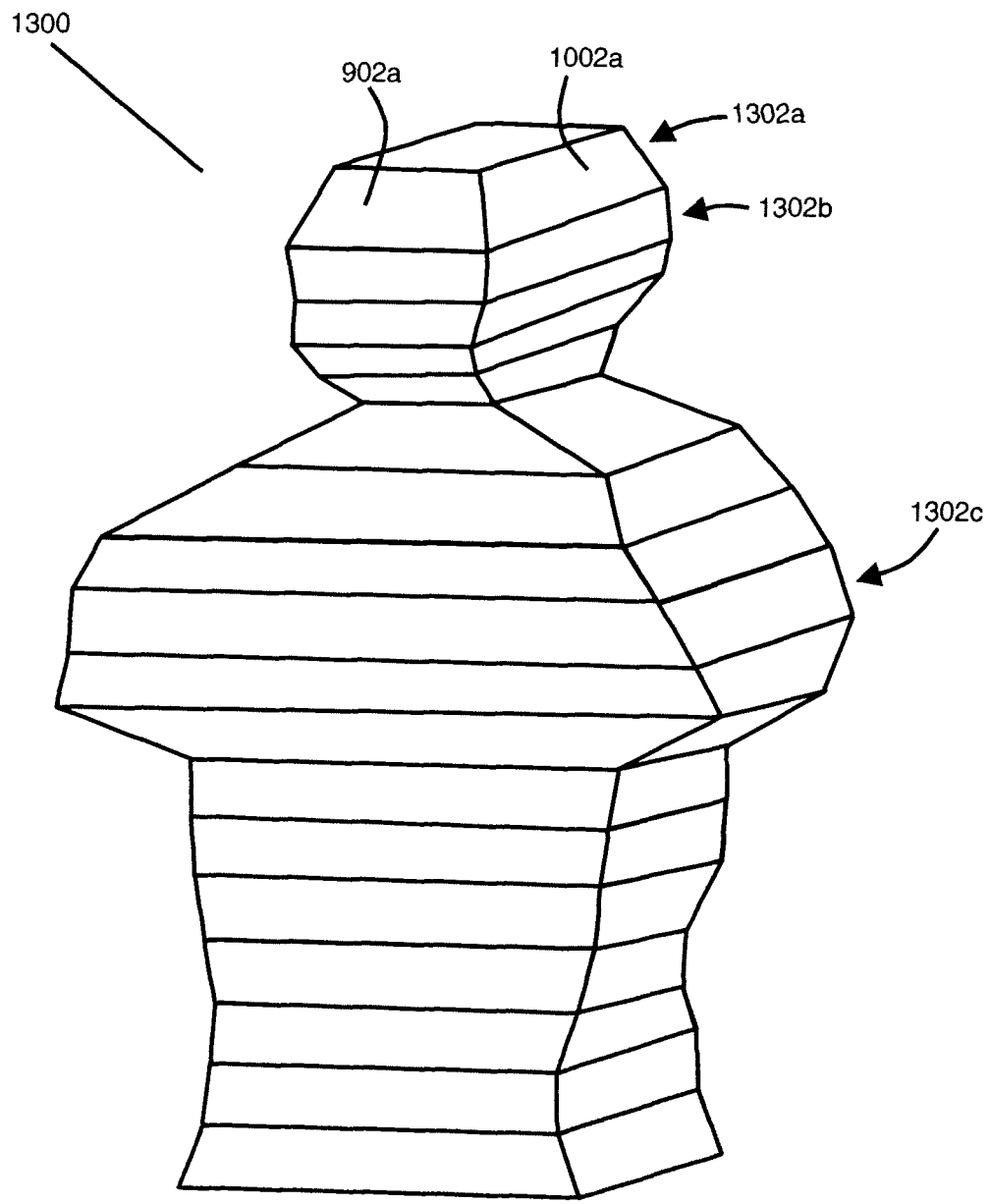
FIG. 13 is a perspective view of a three dimensional model of the individual comprising a plurality of hexahedrons; and, FIG. 14 is a flow diagram showing the steps involved with creating the three dimensional model of the individual.

Referring now to FIG. 13, a three dimensional model of the individual is shown. The three dimensional model is indicated generally by reference numeral 1300 and comprises a plurality of hexahedrons indicated generally by reference numerals 1302a, 1302b, 1302c which are dimensioned in accordance with the amalgamation of the front profiles trapezoids and the side profile trapezoids from the two dimensional front profile 900 and the two dimensional side profile image 1000 respectively. For example, the side faces of the uppermost hexahedron 1302a are given by the uppermost front profile trapezoid 902a and the uppermost side profile trapezoid 1002a.

This three dimensional model 1300 of the individual is used in conjunction with information pertaining to the sleeping habit of the individual to determine the optimal mattress characteristics for the individual.

Based on this three dimensional model 1300, the height of the individual, the body mass of the individual, the mass distribution of the individual and the spinal curvature of the individual may be approximately calculated.

The entire body of an individual may be measured or only a portion of the individual's body may be measured. As the heights of each of the plurality of reference measurement lines is known from the calibration and set up of the body measurement assembly, the height of the individual can be approximately determined. The approximate height is determined by finding the height of the highest broken reference measurement line and then subsequently locating a shoulder-height reference line which is found by determining the highest profile start point and profile end point which are at least 250 mm apart, and the reference line containing these shoulder-height profile start point and profile end point which are at least 250 mm apart is decided to be the shoulder-height reference line. Thereafter, the processor in conjunction with an image analysis unit counts the number of broken reference measurement lines above this shoulder height reference line and adds 100 mm to the height of the highest broken reference measurement line if only one broken reference measurement line is above the shoulder-height reference line. If there are two broken reference measurement lines above the shoulder height reference line, 25 mm is added to the height of the highest broken reference measurement line to give the approximate height of the individual.

The body mass of the individual is calculated by determining the aggregate volume of the hexahedrons in the three dimensional model and multiplying the aggregate volume by a predetermined weight coefficient.

The mass distribution of the individual is calculated by firstly determining a cross-sectional area of a hip-height hexahedron which partially forms the three dimensional model and which hip-height hexahedron has been decided to be located at approximately 50% of the height of the three dimensional model when a full length model is used, or a corresponding height for a partial length model. Secondly the cross-sectional area of a waist-height hexahedron, which partially forms the three dimensional model and has been decided to be located at approximately 65% of the height of the full length model, or a corresponding height for a partial length model, is determined. Lastly, to determine the mass distribution of the individual the cross-sectional area of the hip-height hexahedron is divided by the cross-sectional area of the waist-height hexahedron.

The spinal curvature of the individual is calculated by locating the positions of the neck and sacrum on the individual which are found as a percentage of the individual's approximate height which will already have been determined by the mattress recommendation system. The standard deviation of the profile end points located at the individual's neck and sacrum positions, from a reference point, is calculated to give the spinal curvature of the individual.

These anthropometric details about the individual which are derived from the three dimensional model of the individual and assessed in conjunction with the information pertaining to the sleeping habits of the individual are used to determine the optimal mattress characteristics for the individual, and present these finding to the individual by way of a mattress recommendation.

For example, if the individual has a heavy body mass and the mass distribution is predominately found to be adjacent the individual's waist line rather than their hips then it has been determined that a mattress with relatively firm support, relatively low conformity and relatively high viscosity, which is to say a rather doughy type of foam, is most optimally suited to that type of individual. This is due to the fact that the individual has adipose mass hanging in the waist area which is unsupported by the skeleton and this fatty tissue is quite deformable. Therefore, a large portion of the mass of the individual will deform across the mattress itself and the mattress should be quite firm in support as the fatty mass does not need to penetrate into the mattress, but rather should be supported by the mattress.

In another example, if the individual has a very curvy spine, known as a kypho-lordotic spine, then a mattress with soft support and low conformity is best suited to the individual. It is best to have low conformity and soft support as the mattress should yield to the boney prominences of the S-curved spine.

Figure 14:
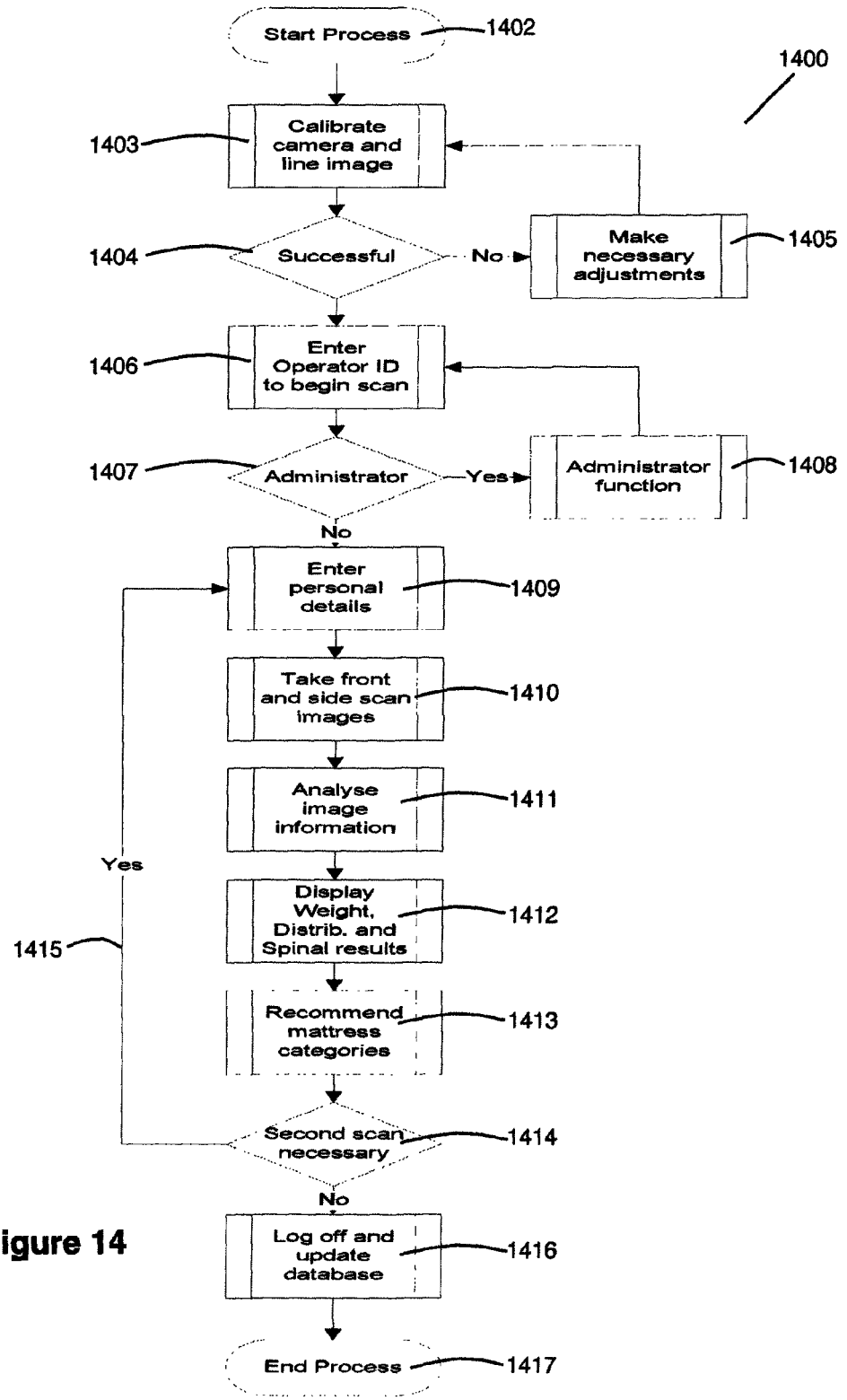

Referring now to FIG. 14, there is shown a flow chart indicated generally by reference numeral 1400 which detail the steps used by the system for recommending a mattress to an individual.

The process used in the system for determining an optimal mattress type for an individual begins in step 1402. The body shape measurement assembly is first calibrated by calibrating the camera with the associated plurality of reference measurement lines. In step 1404, a determination is made as to whether the calibration of the camera with the associated plurality of reference measurement lines has been successful. During the calibration the system checks to ensure that it can find the camera hardware and the processor can communicate with and receive images from the camera. The system also checks to ensure that it can detect the plurality of reference measurement lines and that the substantially full length of the plurality of the reference measurement lines are visible to the camera, that the plurality of reference measurement lines are unbroken and that minimum predetermined distances appear between adjacent reference measurement lines. The system also checks the overall distance from an uppermost reference measurement line to a lowermost reference measurement line. If the calibration is deemed to be unsuccessful, then adjustments are made to the body shape measurement assembly as indicated by step

1405. For example, the positioning of the camera may be altered, the exposure and/or focus of the camera may be altered, or the intensity of the plurality of luminescent reference measurement lines may be altered so as to be more visible to the camera. Thereafter, the calibration of the camera with the plurality of reference measurement lines in step 1403 is re-attempted.

Once the calibration has been deemed to be successful, a trusted operator must enter an identification code, as detailed in step 1406, to allow the body shape measurement assembly to be activated. In step 1407, the system checks whether the identification code entered by the operator is an administrator identification code. If the operator is also a system administrator, then a number of administrator functions may be carried out by the administrator as shown in step 1408. These administrator functions may include adding stock inventory regarding the different types of beds that are available in that particular shop or categorising the types of mattresses that are available in the shop into one of a predetermined set of different mattress types. The administrator functions may also include the administration of an operator database which maintains the identification codes for the various trusted operators and administrators.

In step 1409, the system requests that personal details of the individual to be measured are entered. The details regarding the individual may include the individual's name, contact details, the sex of the individual and the sleeping habits of the individual.

In step 1410, a front image and a side image are taken of the individual and these images are scanned by an image processing unit in the system. The scanned front image and scanned side image are analysed as shown in step 1411. The analysis of the scanned front image and scanned side image results in a three dimensional model of the individual being formed by the system. Using this three dimensional model of the individual, anatomical and anthropometric details about the individual are deduced. The anthropometric details may include, inter alia, the approximate height of the individual, the approximate weight of the individual, the mass distribution of the individual, a portion of the weight throughout at least a portion of the body of the individual and/or the spinal curvature of the individual. These anatomical and anthropometric details are determined and displayed on a screen for use by the operator and/or individual in step 1412. At this point, the operator may review the anthropometric details which have introduced by the system to ensure that there are no obvious anomalies, and if there are no such anomalies, the system recommends a mattress for use by the individual in step 1413.

In step 1414, the operator can decide whether another scan is necessary for that same individual or another individual. If another body measurement scan and mattress recommendation is desired, the system returns to step 1409 as shown by reference line 1415. If no further scans are required at that time, the operator logs off from the system in step 1416 and the system database is updated with a permanent record of the recommendation of the mattress to the individual. The permanent record may include the detail collected concerning the individual including their name, address, age, gender, contact details and other personal details; the profile images, the profile start points and end points, the front hexahedron-based model, the side hexahedron-based model, the three dimensional model, the determined anthropometric details, the determined individual body type, the determined individual type and the optimal mattress type for that individual, as well as system details such as a scan identification code, a user code to identify the operator, time, location and time stamps and the like. The process ends in step 1417.

It will be readily understood that substantially vertical lines may be used in the stead of the substantially horizontal reference measurement lines. Furthermore, in alternative embodiments, a grid of reference measurement lines, or, a plurality of reference measurement dots which are arranged in a uniform, spaced apart fashion may be used. Essentially, any backdrop, once calibrated by the camera of the mattress recommendation system, may be used provided that the backdrop allows a clear profile or outline of an individual to be established so that a front profile image and a side profile image maybe used to create the three dimensional model of the individual.

In yet further embodiments, it is envisaged that a backlit screen with a black out covering having etched lines may be used instead of electroluminescent wires or other such light bars. Alternatively, infrared may be used in brightly lit areas where it may not be possible to provide a booth with a curtain or other such darkened area. In such a scenario, the camera of the system would be particularly adapted to be sensitive to infrared light. It is also to be understood that light of any particular wavelength may be used provided that the camera is adapted to be sensitive to the detection of such light of that particular wavelength.

It is understood that the system for determining an optimal mattress type for an individual, also referred to as the mattress recommendation system throughout the preceding specification, may further comprise a printer to print out different types of mattresses that have the same optimal characteristics for the individual but are of different costs due to different qualities of the foams, springs, stitching, covers and filings used. Such information may also be presented to the individual on the touchscreen.

In another embodiment, the front image and the side image may be taken at same time by two different cameras. In such a case, the two cameras would face against two different sets of a plurality of reference measurement lines. The two sets of the reference measurement lines would need to be accurately calibrated against one another to ensure that the three dimensional model is accurately created. This would speed up the process of scanning the individual which could be of benefit to the comfort of the individual and the usability of the system.

Throughout the preceding specification, the term "profile" shall be understood to refer to the outline of an individual's body shape, or portion thereof.

The terms "comprise" and "include", and any variations thereof required for grammatical reasons, are to be considered as interchangeable and accorded the widest possible interpretation.

The invention is not limited to the embodiments hereinbefore described which may be varied in both construction and detail.

The invention claimed is:

1. A system for determining an optimal mattress type for an individual, the system comprising:
   a body shape measurement assembly comprising a plurality of reference measurement lines which are arranged in parallel and are spaced apart from one another, and, a camera facing the plurality of reference measurement lines which is distanced from the reference measurement lines so as to form a receiving area for the individual;
   the body shape measurement assembly measuring the body shape of the individual in the receiving area by scanning a front image and side image of the individual, analysing the scanned images relative to the plurality of reference measurement lines so as to determine a front profile and a side profile of the individual, which profiles are subsequently used to construct a three dimensional model of the individual;

an optimal mattress type determination means comprising an input device, a processor and an output screen;

the optimal mattress type determination means comparing the three dimensional model against an anatomy model to determine if the three dimensional model meets predetermined anatomical criteria;

the input device receiving information on the sleeping habits of the individual;

the processor analysing the information on the sleeping habits of the individual in conjunction with the three dimensional model of the individual so as to categorise the individual as one of a predetermined set of different individual types;

the processor selecting an optimal mattress type from a predetermined set of different mattress types based on the individual type;

the output screen displaying the selected optimal mattress type for the individual.

2. The system of claim 1, whereby, the body shape measurement assembly further comprises an image processor to analyse the front image and side image by scanning along each of the plurality of reference measurement lines in the front image and side image respectively to determine a profile start point and a profile end point on each of the plurality of reference measurement lines where said profile start points and profile end points on each reference measurement line are defined by the start and end of the profile of the individual blocking a portion of that reference measurement line from the view of the camera.

3. The system of claim 2, whereby, the image processor scans from left to right along each of the plurality of reference measurement lines to determine a profile start point and the image processor scans from right to left along each of the plurality of reference measurement lines to determine a profile end point.

4. The system of claim 2, whereby, the image processor performs a Fourier Transform on the front image and side image to reduce ambient light in the front image and side image respectively.

5. The system of claim 2, whereby, the image processor applies a homogeneity algorithm to the front image and side image to reduce light noise in the front image and side image respectively.

6. The system of claim 1, whereby, each profile is defined by the portions of the reference measurement line that are the largest portions of the reference measurement line blocked from the view of the camera.

7. The system of claim 1, whereby, the plurality of reference measurement lines are electroluminescent wires.

8. The system of claim 1, whereby, the plurality of reference measurement lines are infrared wires.

9. The system of claim 1, whereby, the system further comprises a communications port to transmit results regarding the selected optimal mattress type directly to a manufacturer for further processing.

10. The system of claim 1, whereby, only a portion of the individual's body is measured.

11. The system of claim 10, whereby, the portion of the individual's body which is measured is the upper portion; and, the height of the individual is determined by finding the height of the highest broken reference measurement line; locating a shoulder height reference line which is found by determining the highest profile start point and profile end point which are at least 250 mm apart; counting the number of broken reference measurement lines above this shoulder height reference line; and, adding 100 mm to the height of the highest broken reference measurement line if only one broken reference measurement line is above the shoulder height reference to give the approximate height of the individual, or, adding 25 mm to the height of the highest broken reference measurement line if two broken reference measurement lines are above the shoulder height reference line to give the approximate height of the individual.

12. The system of claim 1, whereby, the body shape measurement assembly determines body mass, mass distribution and spinal curvature for at least a portion of the individual's body.

13. The system of claim 12, whereby, the three dimensional model of the individual is comprised of hexahedrons.

14. The system of claim 13, whereby, the body mass of the individual is calculated by determining the aggregate volume of the hexahedrons in the three dimensional model and multiplying the aggregate volume by a predetermined weight coefficient.

15. The system of claim 13, whereby, the mass distribution of the individual is calculated by determining a cross-sectional area of a hip-height hexahedron which partially forms the three dimensional model and is located at approximately 50% of the height of the model, and, determining a cross-sectional area of a waist-height hexahedron which partially forms the three dimensional model and is located at approximately 65% of the height of the model; and, dividing the cross-sectional area of the hip-height hexahedron by the cross-sectional area of the waist-height hexahedron to determine the mass distribution of the individual.

16. The system of claim 13, whereby, the spinal curvature of the individual is calculated by locating the positions of the neck and sacrum on the individual which are found as a percentage of the individual's height; and the standard deviation of the profile end points located at the individual's neck and sacrum positions is calculated to give the spinal curvature of the individual.

17. The system of claim 12, whereby, the body mass, mass distribution and spinal curvature of the individual are determined to fall into one of three preset ranges respectively.

18. The system of claim 17, whereby, a combination of the preset ranges for the individual's body mass, mass distribution and spinal curvature is used to categorise the individual into one of the predetermined set of different individual types.

19. A system for determining an optimal mattress type for an individual, the system comprising:
 a body shape measurement assembly comprising a plurality of reference measurement lines which are arranged in parallel and are spaced apart from one another, and, a camera facing the plurality of reference measurement lines which is distanced from the reference measurement lines so as to form a receiving area for the individual;
 the body shape measurement assembly measuring the body shape of the individual in the receiving area by scanning a front image and side image of the individual, analysing the scanned images relative to the plurality of reference measurement lines so as to determine a front profile and a side profile of the individual, which profiles are subsequently used to construct a three dimensional model of the individual;

an optimal mattress type determination means comprising an input device, a processor and an output screen;

the input device receiving information on the sleeping habits of the individual;

the processor analysing the information on the sleeping habits of the individual in conjunction with the three dimensional model of the individual so as to categorise the individual as one of a predetermined set of different individual types;

the processor selecting an optimal mattress type from a predetermined set of different mattress types based on the individual type;

the output screen displaying the selected optimal mattress type for the individual;

whereby, only an upper portion of the individual's body is measured; and, the height of the individual is determined by finding the height of the highest broken reference measurement line; locating a shoulder height reference line which is found by determining the highest profile start point and profile end point which are at least 250 mm apart; counting the number of broken reference measurement lines above this shoulder height reference line; and, adding 100 mm to the height of the highest broken reference measurement line if only one broken reference measurement line is above the shoulder height reference to give the approximate height of the individual, or, adding 25 mm to the height of the highest broken reference measurement line if two broken reference measurement lines are above the shoulder height reference line to give the approximate height of the individual.

20. A system for determining an optimal mattress type for an individual, the system comprising:

a body shape measurement assembly comprising a plurality of reference measurement lines which are arranged in parallel and are spaced apart from one another, and, a camera facing the plurality of reference measurement lines which is distanced from the reference measurement lines so as to form a receiving area for the individual;

the body shape measurement assembly measuring the body shape of the individual in the receiving area by scanning a front image and side image of the individual, analysing the scanned images relative to the plurality of reference measurement lines so as to determine a front profile and a side profile of the individual, which profiles are subsequently used to construct a three dimensional model of the individual;

the body shape measurement assembly determines body mass, mass distribution and spinal curvature for at least a portion of the individual's body;

the three dimensional model of the individual is comprised of hexahedrons;

the body mass of the individual is calculated by determining the aggregate volume of the hexahedrons in the three dimensional model and multiplying the aggregate volume by a predetermined weight coefficient;

an optimal mattress type determination means comprising an input device, a processor and an output screen;

the input device receiving information on the sleeping habits of the individual;

the processor analysing the information on the sleeping habits of the individual in conjunction with the three dimensional model of the individual so as to categorise the individual as one of a predetermined set of different individual types;

the processor selecting an optimal mattress type from a predetermined set of different mattress types based on the individual type;

the output screen displaying the selected optimal mattress type for the individual.

* * * * *